(No Model.)

G. B. GRANT.
MICROMETER GAGE.

No. 334,770. Patented Jan. 26, 1886.

Witnesses:
S. C. Wheeler
S. A. Whulin

Inventor:
Geo. B. Grant.

UNITED STATES PATENT OFFICE.

GEORGE B. GRANT, OF MALDEN, MASSACHUSETTS.

MICROMETER-GAGE.

SPECIFICATION forming part of Letters Patent No. 334,770, dated January 26, 1886.

Application filed July 27, 1885. Serial No. 172,821. (No model.)

*To all whom it may concern:*

Be it known that I, GEORGE B. GRANT, of Malden, in the county of Middlesex and State of Massachusetts, have invented a new and useful Improvement in Micrometer-Calipers; and I hereby declare that the following is a full and clear description of the same, reference being had to the accompanying drawings, forming a part of this specification.

This invention relates to micrometer-calipers; and it consists, principally, in providing a second reading-scale by which the measurements are indicated in eighths, thirty-seconds, and sixty-fourths of an inch, in addition to the usual scale to tenths, hundredths, and thousandths of an inch.

It consists, also, in a novel arrangement of the scales and indices, which simplifies the construction of the instrument, and in a double clamp for holding the measuring-pin.

Figure 1:
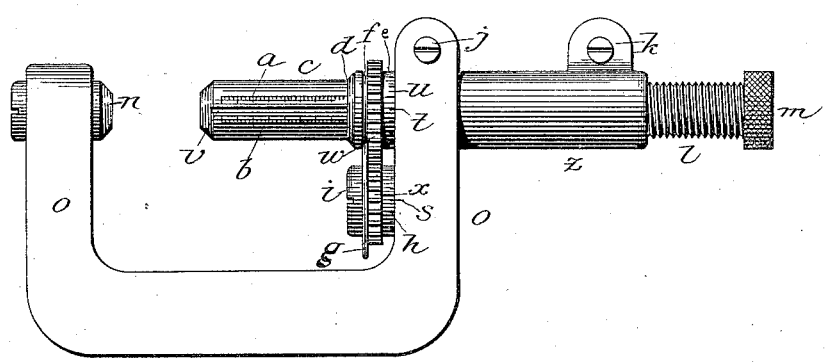
Figure 2:
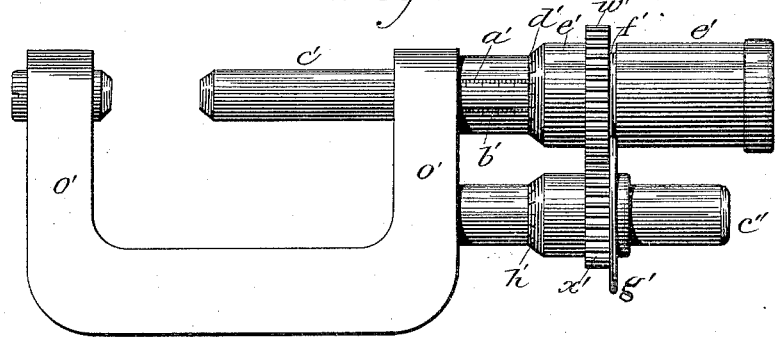

Figure 1 shows the whole invention, and Fig. 2 shows a second and equivalent arrangement of some of its parts.

I prefer the arrangement shown by Fig. 1, where the measuring-pin $c$ has two linear scales upon it, one scale, $a$, being graduated to thirty-seconds, and the other scale, $b$, as usual, to fortieths, of an inch. The whole number of thirty-seconds or fortieths are read off on these linear scales at an index-edge, $d$, in this case the edge of the ring $e$. The fractional parts of the decimal scale $b$ are read off on the ring-scale $u$ at the index-point $t$, while the fractional parts of the scale of thirty-second are read on the ring-scale $h$ at the index $s$. The ring $e$ has a gear, $w$, and the ring $h$ a gear, $x$, and these gears have numbers of teeth in the proportion of thirty-two teeth on $w$ to forty teeth on $x$, or in the proportion of the graduations of the linear scales, whatever that may be. The ring $h$ is held in place by the screw-head $i$, and the ring $e$ must be held by suitable means—such as the groove $f$ and the flange $g$. The frame $o$ is split, so that the clamping-jaws and screw $j$ hold the pin $c$ firmly at its unthreaded end and may be set up to lock it or hold it fast when desired. The tension of the nut $z$ is regulated by the clamping screws and jaws $k$. The measuring-pin $c$ is threaded at its outer end, $l$, and bears a milled head, $m$, by which it is turned. The frame $o$ and the anvil or stop $n$ are of the ordinary form.

I show at Fig. 2 a construction involving many of the same elements in different but equivalent forms. The decimal scale $b'$ is of the common form, and the scale of thirty-seconds $a'$ is similar to it and placed upon the same post. The two rings $e'$, fixed to the pin $c'$, and $h'$, on a separate fixed pin, $c''$, are connected by the gears $w'$ and $x'$. A groove, $f'$, and a flange, $g'$, make the two ring-scales $e'$ and $h'$ move together; but any device will be equivalent that will make the two rings move on their pins at the same rate, or at different rates that have a fixed relation to each other.

The prime features of this invention are the two linear scales, the two ring-scales, and the two gears connecting the two ring-scales, and these may be arranged in many different ways without altering their character.

The use of two separate clamps, $j$ and $k$, has the advantage that the nut-clamp $k$ may be set to give the right tension or bearing between the nut and the screw, and the clamp $j$ used separately to hold the other end of the pin $c$ or to lock it when a given measurement has been set up and must be fixed securely for some time. The pin cannot be properly held at both ends by the same clamp, and the nut-clamp should never be used to lock the pin.

The placing of the linear scale $a$ or $b$ upon the pin $c$, as in Fig. 1, instead of upon a fixed post, as usual, and as shown by Fig. 2, simplifies and cheapens the construction of the instrument.

One of the rings is preferably, but not necessarily, on the pin $c$, and is connected to turn with it by the slot $v$ and a pin in the ring. Both rings may be separate from the pin $c$, or one may be fastened to it in any manner, if they are connected in any manner to turn with it. There is no necessity that the ring $e$ and index-edge $d$ shall be upon the same piece, but they are preferably so connected. The two linear scales $a$ and $b$ are preferably upon the same piece, on the same pin $c$, as in Fig. 1, or on the same post, as in Fig. 2, and read by the single index-edge $d$ or $d'$.

I claim—

1. The combination, upon a micrometer-caliper, of two linear scales divided to different graduations, and two ring-scales connected to turn together at rates of speed that are in the proportion of the graduations of the linear scales, as described.

2. The linear scale upon the inner and unthreaded end of the measuring-pin, in combination with the index-edge $d$, as described.

3. The ring-scale $e$ on the pin $c$ and on the inside of the frame $o$, sliding upon and connected to turn with the pin $c$, as described.

4. The two ring-scales $e$ and $h$ on the inside of the frame $o$, the ring $e$ being connected to turn with the pin $c$, and the two rings being geared to turn together, as described.

5. The combination of the two ring-scales $e$ and $h$, the gears $w$ and $x$, the groove $f$, and the flange $g$, as described.

6. The combination of the pin $c$, smooth at its inner end and threaded at its outer end, with the clamping-jaws $j$, holding its smooth end, and the clamping-nut $k$, holding its threaded end, as described.

7. The combination, on a micrometer-caliper, of two linear scales near together on the same piece, with a single index-edge and with two separate ring-scales geared to run together at rates of speed that are in the proportion of the graduations of the linear scales, as described.

GEO. B. GRANT.

Witnesses:
I. C. WHEELER,
C. I. BAILEY.